No. 607,222. Patented July 12, 1898.
O. C. DAVIS.
SHAFT OR POLE COUPLING FOR VEHICLES.
(Application filed May 24, 1897.)
(No Model.)
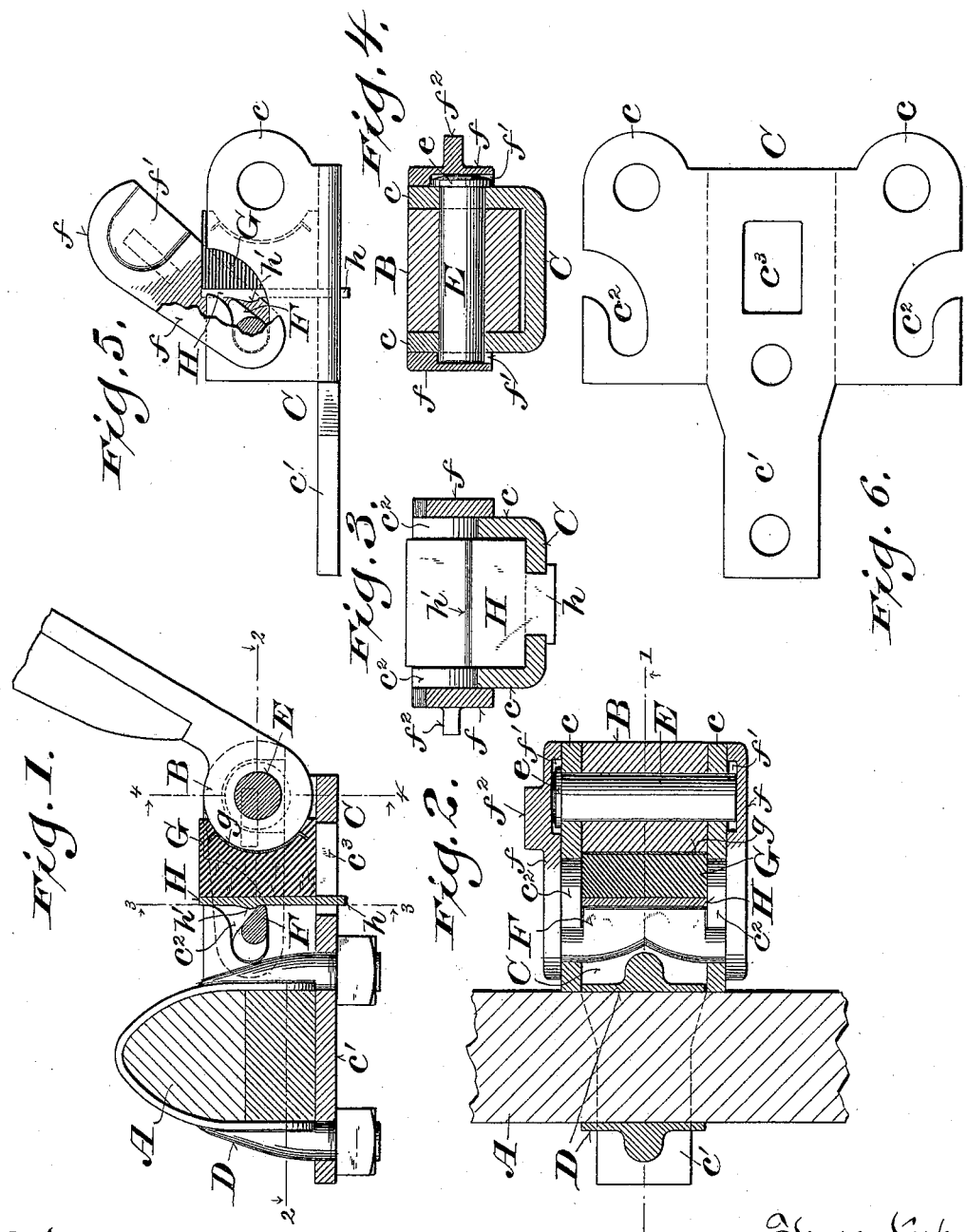

UNITED STATES PATENT OFFICE.

ORIN C. DAVIS, OF MANISTEE, MICHIGAN, ASSIGNOR OF ONE-HALF TO WILLIAM R. THORSEN AND HENRY W. LEONARD, OF SAME PLACE.

SHAFT OR POLE COUPLING FOR VEHICLES.

SPECIFICATION forming part of Letters Patent No. 607,222, dated July 12, 1898.

Application filed May 24, 1897. Serial No. 637,828. (No model.)

*To all whom it may concern:*

Be it known that I, ORIN C. DAVIS, of Manistee, in the county of Manistee and State of Michigan, have invented certain new and useful Improvements in Shaft or Pole Couplings for Vehicles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to prevent wear and rattling and to facilitate attaching and detaching shafts or pole to and from a vehicle and changing from one to the other.

It consists of certain novel features in the construction and arrangement of component parts of the coupling, as hereinafter particularly described, and pointed out in the claims.

In the accompanying drawings like letters designate the same parts in the several figures.

Figure 1 is a vertical section of my improved coupling on the line 1 1, Fig. 2. Fig. 2 is a horizontal section of the same on the line 2 2, Fig. 1. Figs. 3 and 4 are cross-sections on the lines 3 3 and 4 4, respectively, Fig. 1. Fig. 5 is a side elevation of a portion of the coupling, the front pin-retaining arm being broken away and the other arm, with the cam, being turned up into position for uncoupling; and Fig. 6 is a plan view of the blank from which the shackle is made.

A designates the axle of a vehicle, and B a shaft or pole eye of the ordinary construction.

C is the shackle, which consists of a pair of ears $c\ c$, formed integrally with a clip-yoke $c'$, by which the shackle is secured to the axle by an ordinary clip D, as shown in Fig. 1. The ears are formed with plain holes in line with each other to receive the coupling-pin E, which is made plain and preferably formed, as shown in Figs. 2 and 4, with a flat or thin head $e$. The ears are also formed through the upper edges, behind the pin-holes, with downwardly and rearwardly inclined or curved recesses $c^2$, which terminate near the axle in semicylindrical or rounded ends and serve as bearings for the cam-bar hereinafter described. Between the ears $c\ c$ the shackle is formed with a rectangular slot or opening $c^3$. I prefer to construct the shackle by cutting or stamping it out of a flat piece of metal of the required thickness, as shown in Fig. 6, and in bending the sides up parallel with each other to form ears $c\ c$. By this construction the manufacture of the coupling is simplified and its cost reduced. By forming the ears with a clip-yoke the coupling may be readily applied to an old vehicle, the same or like clips being employed for attaching it to the axle as were previously used thereon, thus avoiding marring the axle or the necessity of refinishing it, since clips may be selected to cover as much of the axle as was covered by the clips or couplings originally used. The coupling-pin E fits freely in the holes in the ears $c\ c$ and eye B and pivotally connects them in the usual manner, as shown in Fig. 2.

F is a cam or cam-bar journaled in the recesses $c^2$ of the ears $c$, substantially parallel with the holes for the coupling-pin. It is provided at the ends with arms $f\ f$, which are preferably formed integrally therewith and are fitted close to the outer faces of the ears $c$. These arms are formed in their inner faces, near their outer ends, with recesses $f'$, opening, as shown in Fig. 5, through their lower edges to pass over the protruding ends of the coupling-pin, as shown in Figs. 2 and 4, and to engage with the top of the pin, as seen in Fig. 4.

G is a spring for taking up wear and play between the coupling-pin, eye, and shackle. It is preferably made of rubber concaved on the front side to fit the back of the eye and provided with a thin metal bushing or wearing-plate $g$ to prevent wear of the rubber by the movement of the eye against it. This plate is preferably bent at its upper and lower edges toward and embedded in the rubber, as shown in Fig. 1, to hold it in place.

H is a metallic bearing-plate interposed between the back of the rubber spring and the cam-bar. It is formed on the under side with an extension $h$, notched in the sides to engage with the edges of the shackle at the sides of the slot $c^3$ and to retain it in place. It is also preferably formed on the back with a rib or projection $h'$, over and below which the cam is forced when the arms $f$ are turned down over and into engagement with the ends of the coupling-pin, as shown in Figs. 1 and 2, and by which said cam and arms are prevented from being accidentally turned upward, so as to release the coupling-pin and spring. This rib or projection may, however, be dispensed with, as the cam is set at such an angle to the arms $ff$ as to pass a little below the axis on which it turns when said arms are forced down as far as the coupling-pin will permit, so that the expansive force of the rubber or spring tends to hold said arms down in engagement with said pin. One of the arms, preferably the inner one, on the opposite side of the coupling from the adjacent vehicle-wheel, is formed with a lip or flange $f^2$ to receive a wrench for turning it into and out of engagement with the coupling-pin and forcing the cam into and out of position to compress the spring G against the back of the eye B. The arms $ff$ are preferably made quite flat or thin horizontally and conform in shape with the ears $c\ c$, to the outer faces of which they are closely fitted, so as to make the coupling compact, symmetrical, and attractive in appearance.

The journals of the cam-bar F are made cylindrical, so as to turn easily in their bearings, and the arms $f$ are made to engage the top of the coupling-pin at its ends, and thus serve not only to retain said pin in place, but also to limit its downward movement when the cam has passed slightly by the center on which it turns. By forming the recesses $c^2$ in the coupling-ears, as shown, I am enabled to construct the cam-bar F and its arms $ff$ integrally with each other, and thus make it much lighter than it would be necessary to make it in separate parts. The construction of the coupling is also simplified and made cheaper in this way.

I do not wish to be understood as limiting myself to the exact details of construction shown and described, as they may be variously modified within the intended scope of my invention—as, for instance, a metal spring may be substituted for the rubber and one of the arms $f$ of the pin-holding and spring-compressing device may be dispensed with.

I claim—

1. In a shaft or pole coupling for vehicles the combination with a pair of ears, a shaft or pole eye, a coupling-pin having a headed end and loosely fitted in the holes of said ears and eye, and a spring for taking up play between the parts of the coupling, of a cam having bearings in said ears behind and parallel with the coupling-pin and provided with an arm adapted, when turned forward and downward, to force the cam against the spring and to press the latter against the eye and recessed to pass over and engage with the headed end of the coupling-pin and thus retain the latter in place and arrest and hold the cam in compressing position, substantially as and for the purposes set forth.

2. In a shaft or pole coupling, the combination with a shaft or pole eye, a pair of perforated ears, a coupling-pin for connecting them and a spring for taking up play between the parts of the coupling, of a cam having cylindrical journals which are held and adapted to turn in said ears behind and parallel with the coupling-pin and provided at its ends with arms which are recessed to pass over and engage with the protruding ends of the coupling-pin, said arms serving to retain the pin in place, to force the cam into and out of operative position for compressing the spring, and to hold the cam in operative position, substantially as and for the purposes set forth.

3. In a shaft or pole coupling the combination of a pair of transversely-perforated ears having downwardly and rearwardly inclined recesses formed through their upper edges behind and parallel with the holes for the coupling-pin, a shaft or pole eye, a pin for connecting said eye with said ears, a spring for taking up play in the coupling and a cam having journals adapted to turn in the recesses in said ears and provided with arms which are formed integrally therewith and are adapted to turn down approximately parallel with said ears to compress said springs against the back of said eye and by engagement with the ends of the pin to retain it in place and to arrest and hold the cam in compressing position, substantially as and for the purposes set forth.

4. In a shaft or pole coupling the combination of a shackle having a pair of transversely-perforated ears connected together by a bottom piece having a slot or opening therein between said ears, a shaft or pole eye, a coupling-pin for connecting said eye with said ears, a cam journaled in said ears behind and parallel with the coupling-pin, a rubber spring inserted between said cam-bar and eye, and a bearing-plate interposed between the back of the rubber and said cam, and notched to engage with the edges of the opening in the bottom of the shackle, substantially as and for the purposes set forth.

5. In a shaft or pole coupling the combination of a shackle having a pair of ears, a shaft or pole eye, a coupling-pin for connecting the eye with said ears, a cam journaled in said ears, a rubber spring between the eye and cam, and a plate interposed between the rubber and the cam and formed on the back with a rib or projection for holding the cam in engagement therewith, substantially as and for the purposes set forth.

6. In a shaft or pole coupling the combination of a shackle having two transversely-perforated ears formed integrally with a clip-yoke and a slot in the bottom between the ears, a shaft or pole eye, a coupling-pin for connecting said eye with said ears, a cam loosely journaled in recesses which open through the upper edges of said ears, and formed integrally with flat arms which fit close to and correspond in shape with the outer sides of said ears and are recessed to pass over and engage with the ends of said pin, one of said arms being formed with an ear or flange for turning the cam into and out of operative position, a rubber spring between the eye and cam, and a bearing-plate interposed between the rubber and cam, and notched to engage the edges of the slot in the shackle, substantially as and for the purposes set forth.

In testimony that I claim the foregoing as my own I affix my signature in presence of two witnesses.

ORIN C. DAVIS.

Witnesses:
   H. D. ROBINSON,
   L. WELLMAN.